(12) United States Patent
Namimatsu et al.

(10) Patent No.: US 6,216,821 B1
(45) Date of Patent: Apr. 17, 2001

(54) LUBRICATING APPARATUS FOR BALL SCREW

(75) Inventors: Ken Namimatsu; Osamu Ideta; Kazuo Miyaguchi, all of Maebashi; Toshikazu Yabe, Fujisawa, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/104,517

(22) Filed: Jun. 25, 1998

(30) Foreign Application Priority Data

Jul. 24, 1997 (JP) .................................................... 9-212671
Oct. 22, 1997 (JP) .................................................... 9-306374

(51) Int. Cl.⁷ .................................................... F16N 15/00
(52) U.S. Cl. .................... 184/99; 74/89.15; 74/424.8 R; 74/459
(58) Field of Search .................................. 184/5, 98, 99; 74/89.15, 424.8 R, 424.8 NA, 459

(56) References Cited

U.S. PATENT DOCUMENTS

| | | | |
|---|---|---|---|
| 3,541,011 | * 11/1970 | Davis et al. | 252/12 |
| 3,547,819 | * 12/1970 | Davis et al. | 252/12 |
| 3,729,415 | * 4/1973 | Davis et al. | 252/25 |
| 4,239,632 | * 12/1980 | Baile | 252/12 |
| 5,168,767 | * 12/1992 | Morita | 74/424.8 NA |
| 5,749,266 | * 5/1998 | Tsukada | 74/459 |
| 5,782,135 | * 7/1998 | Kondo et al. | 74/459 |
| 5,906,136 | * 5/1999 | Yabe et al. | 74/459 |

FOREIGN PATENT DOCUMENTS

| 62-134957 | 8/1987 | (JP) . |
|---|---|---|
| 6-47762 | 6/1994 | (JP) . |
| 7-4952 | 1/1995 | (JP) . |

* cited by examiner

*Primary Examiner*—David Fenstermacher
(74) *Attorney, Agent, or Firm*—Marshall, O'Toole, Gerstein, Murray & Borun

(57) ABSTRACT

A lubricating apparatus for a ball screw which can sufficiently lubricate even in a high load usage is disposed between a ball nut and a screw shaft, and a polymer member containing a lubricant being mainly in slidable contact with an outer diameter portion of the screw shaft is mounted to at least any one of both ends of the ball nut and a space including a ball not-passing space in an inner portion of the ball nut. The polymer member prevents the lubricant attached to the thread groove of the screw shaft from being scraped off during oscillations of the screw shaft, such that the lubricant attached to the thread groove can be efficiently maintained.

17 Claims, 19 Drawing Sheets

LUBRICATING APPARATUS FOR BALL SCREW

BACKGROUND OF THE INVENTION

The present invention relates to a lubricating apparatus for a ball screw, and more particularly to a lubricating thread capable of supplying a lubricant to a ball screw for a long time.

A ball screw is a mechanism for converting rotational motion into linear motion. In the ball screw, a plurality of balls are interposed between a screw shaft having a thread groove on an outer periphery thereof and a ball nut having a thread groove on an inner periphery thereof opposed to the screw shaft thread groove. The ball nut is moved axially by rotating the screw shaft.

A lubricant such as a grease is normally applied to a portion between the thread groove and the ball, thereby preventing the thread groove and the ball from abrading and heating because of the friction between the thread groove and the ball. However, the effectiveness of the grease in reducing the friction is quickly diminished by such factors as temperature, moisture, foreign material and abrasion, such that it is necessary to periodically add additional lubricant. Therefore, apparatuses for supplying additional lubricant have been designed.

However, such supplying apparatuses are typically expensive. Moreover, because it is necessary to provide a piping for supplying oil to the apparatus, additional costs are incurred. Further, these apparatuses are inconvenient in that it is necessary to inspect and maintain the supplying apparatus.

By comparison, it has also been suggested to dispose a polymer member containing a lubricant between the screw shaft of the ball screw and the ball nut. The polymer member is designed so that the lubricant gradually oozes out of the polymer member over a long period of time. Thus, the thread groove and the ball remain lubricated as a consequence of the lubricant oozing out of the polymer member containing the lubricant even after the lubricating function of the grease initially applied to the thread groove is diminished. Accordingly, such a device is substantially maintenance-free.

There are still problems with using the polymer member described above. By way of illustration, FIG. 15 is a cross sectional view which shows a ball screw using a polymer member containing a lubricant as described above. In FIG. 15, a cylindrical ball nut 2 is disposed around a screw shaft 1. A polymer member 10 containing a lubricant is disposed between an inner peripheral surface 5a of an annular recess portion 5 formed on an end surface of the ball nut and an outer peripheral surface of the screw shaft 1. The polymer member 10 acts as a seal to seal grease within the ball nut 2.

A garter spring 15 is fitted into an outer peripheral surface 10b of the polymer member 10. With the garter spring 15 radially pressing the polymer member 10 into the thread groove 1b of the screw shaft 1 at a fixed pressure, suitable contact with the screw shaft 1 is maintained and good lubrication is maintained even when the inner peripheral surface of the polymer member 10 is abraded.

FIG. 16 is a cross sectional view of the ball screw of FIG. 15 taken along a line XVI—XVI. FIG. 17 is an enlarged cross sectional view of the ball screw of FIG. 15 taken along a line XVII—XVII.

In FIG. 16, the polymer member 10 includes an upper half portion 10c and a lower half portion 10d, each formed in a substantially half cylindrical shape. In the upper half portion 10c and the lower half portion 10d, all of the inner peripheral portions are in close contact with the outer peripheral portion of the screw shaft 1. A gap A is formed between the upper half portion 10c and the lower half portion 10d.

Comparing FIG. 16 with FIG. 15, it will be recognized that a convex portion 10a of the polymer member 10 is disposed in such a manner as to be in close contact with the outer peripheral portion of the thread groove 1b of the screw shaft 1. As shown in FIGS. 16 and 17, when the convex portion 10a of the polymer member 10 is in close contact with the thread groove 1b and the screw shaft 1 oscillates relative to the cylindrical ball nut 2, the lubricant attached to an inner portion of the thread groove 1b is scraped out to the stroke end of the screw shaft 1 by a sliding convex portion 10a of the polymer member 10. In fact, as shown in FIG. 16, when an end portion (a portion facing to the gap A) of the convex portion 10a comes in close contact with the thread groove 1b without any gap, there occurs a so-called scraper effect, that is, the end portion scrapes out the lubricant attached to the thread groove 1b to the gap A. The lubricant scraped out to the gap A is hardly used for lubricating.

Thus, the amount of the lubricant essentially supplied to the thread groove is decreased because of the shape of the polymer member 10 containing the lubricant. In an application wherein the ball screw supports a large load, not enough lubricant will remain to lubricate the ball screw, such that there is a risk of abnormal abrasion and early breakage of the thread groove and the ball.

SUMMARY OF THE INVENTION

The present invention is made by taking the conventional problems into consideration, and an object of the invention is to provide a lubricating apparatus for a ball screw which can sufficiently lubricate the ball screw even when large loads are supported.

The above-mentioned object can be attained through the use of a lubricating apparatus for a ball screw according to the present invention, wherein a polymer member containing a lubricant is disposed between a ball nut and a screw shaft such that the polymer member is mainly in slidable contact with an outer diameter portion of the screw shaft and is mounted to at least any one of both ends of the ball nut and a space including a ball not-passing space in an inner portion of the ball nut. Accordingly, the polymer member does not scrape off the lubricant attached to the thread groove when the screw shaft oscillates relative to the cylindrical ball nut, such that the lubricant attached to the thread groove can be effectively maintained.

In addition, in accordance with the present invention, the above-mentioned object can also be achieved through the use of a lubricating apparatus for a ball screw in which a polymer member containing a lubricant is disposed between a ball nut and a screw shaft such that the polymer member is in slidable contact with only an outer diameter portion of the screw shaft and is mounted to at least any one of both ends of the ball nut and a space including a ball not-passing space in an inner portion of the ball nut. Accordingly, the polymer member does not scrape off the lubricant attached to the thread groove when the screw shaft oscillates relative to the cylindrical ball nut, such that the lubricant attached to the thread groove can be effectively maintained.

Further, in accordance with the present invention, the above-mentioned object can also be achieved through the use of a lubricating apparatus for a ball screw including a polymer member containing a lubricant which is disposed between a ball nut and a screw shaft such that the polymer member is slidably contactable with an outer diameter portion of the screw shaft and is mounted to at least any one of both ends of the ball nut and a space including a ball not-passing space in an inner portion of the ball nut, the polymer member being partially engaged with a portion of the surface of thread groove formed on the screw shaft adjacent to the outer diameter portion of the screw shaft but disengaged from the bottom surface of the thread groove.

Further, in combination with any of the foregoing, the polymer member is preferably separated into a plurality of sections in a circumferential direction, or a slit is provided along a radial direction, so that an inner diameter size thereof is made larger than an outer diameter of the screw shaft. The gap thus formed between the outer diameter portion of the screw shaft and the polymer member containing the lubricant further enhances the retention of the lubricant.

Still further, in combination with any of the foregoing, a beveling for holding lubricant is preferably formed in an end portion of the polymer member close to an inner diameter of a separated surface. Consequently, even when lubricant attached to the thread groove is scraped off by the rotation of the polymer member, the lubricant is retained in the beveling so that it is still available to lubricate the associated ball screw.

Furthermore, when the polymer member is formed as to be in slidable contact with only the outer diameter portion of the screw shaft, the shape of the polymer member does not have to coincide with that of the thread groove of the screw shaft, which has attendant advantages. That is, to produce a polymer member which has a projecting portion corresponding to the thread groove by molding, it is necessary to prepare a mold wherein the projection portion of the member accurately corresponds to the thread groove. To make an accurate mold, the mold is typically modified several times on the basis of trial and error taking the rate of shrinkage in the molded product of the polymer member into consideration. Alternatively, to form the projecting portion in the polymer member by the machining, it is necessary to make a special tool corresponding to the shape of the projecting portion. In either case, the cost of manufacturing the polymer member can be quite high. By comparison, if the projecting portion is not required, then it is not necessary to make either the mold or the tool mentioned above, and it is sufficient to consider only the shaft diameter of the ball screw shaft, which results in a cost reduction relative to the methods discussed above.

In such a case, the polymer member according to the invention is made by heating a mixture of a paraffin hydrocarbon oil such as a poly α-olefin oil, a naphthene hydrocarbon oil, a mineral oil, an ether oil such as a dialkyl diphenyl ether oil and an ester oil such as an ester phthalate as a lubricant with a synthetic resin selected from a polyolefin resin group basically having the same chemical construction as a polyethylene, a polypropylene, a polybutylene and a polymethyl pentene at a temperature equal to or more than a melting point of the resin so as to plasticize the mixture. Thereafter, the mixture is cooled to a solid state. Various additive agents, such as antioxidants, anti-corrosive compositions, abrasion preventing agents, defoaming agents and extreme pressure agents, may be added to the lubricant.

The above-mentioned polymer composition comprises 10 to 50 weight % of a poly olefin resin relative to the entire weight and 90 to 50 weight % of a lubricant. If the poly olefin resin is less than 10 weight %, the hardness and strength is such that it is hard to maintain an initial shape when the load is applied. Further, if the poly olefin resin is more than 50 weight % (that is, if the lubricant is less than 50 weight %), an insufficient amount lubricant will be provided by the polymer composition such that the life of the ball screw is shorter.

The synthetic resin group mentioned above has the same basic structure and a different mean molecular weight in the range of 700 to $5 \times 10^6$. The resin group may be classified as a wax having a mean molecular weight of 700 to $1 \times 10^4$, a structure with a relatively low molecular weight having a mean molecular weight of $1 \times 10^4$ to $1 \times 10^6$ and a structure with an extremely high molecular weight having a mean molecular weight of $1 \times 10^6$ to $5 \times 10^6$, and the resins of different classifications may be used individually or in combination, as required by the application.

A certain level of mechanical strength, lubricant supplying capability and oil keeping performance can be obtained by combining a resin classified as a structure having a relatively low molecular weight and the lubricant. If the resin classified as a structure having a relatively low molecular weight is replaced with a resin classified as a wax, an affinity for a lubricating oil is increased because of the small difference in molecular weight between the structure classified as a wax and the lubricating oil, such that the oil keeping capability of the polymer member is improved, and the lubricant can be supplied over a long period of time. However, the mechanical strength of the composition is lowered as a consequence. In this case, as the wax, in addition to the polyolefin resin such as a polyethelene wax, a hydrocarbon group having a melting point within a range equal to or more than 100 to 130° C. (for example, a paraffin synthetic wax) can be used.

Alternatively, if a structure having an extremely great molecular weight is used, the affinity of the polymer member for a lubricating oil is lessened of a large difference in a molecular weight between the structure having an extremely great molecular weight and the lubricating oil, such that the oil keeping capability is lessened, and the lubricant oozes out from the polymer member at a fast speed. Accordingly, the time necessary for the polymer member to release an amount of lubricant is decreased, such that the life of the ball screw is shortened. However, the mechanical strength is improved.

Balancing the different factors of formability, mechanical strength, oil keeping capability and lubricant-supplying capability, the polymer member preferably includes a resin fraction of 0 to 5 weight % of a wax, 8 to 48 weight % of a structure having a relatively low molecular weight, 2 to 10 weight % of a structure having an extremely high molecular weight and 10 to 50 weight % of a mixture of the three resin structures (90 to 50 weight % of the lubricant making up the remainder of the polymer member).

In order to improve the mechanical strength of the polymer member in accordance with the invention, a thermoplastic resin or a thermosetting resin can be added to the polyolefin resin mentioned above. As the thermoplastic resin, various kinds of resins such as a polyamide, a polycarbonate, a polybutylene terephtalate, a polyphenylene sulfide, a polyether sulfone, a polyether ether ketone, a polyamide imide, a polystyrene and an ABS resin can be used. As the thermosetting resin, various kinds of resins such as an unsaturated polyester resin, an ureaformaldehyde resin, a melanin resin, a phenol aldehyde resin, a polyimide resin and an epoxy resin can be used. These resins can be used individually or in combination.

Further, in order to disperse the polyolefin resin and the other resins in a more uniform state, a suitable phase soluble agent may be added as occasion demands. Still further, in order to improve the mechanical strength, a filler may be added. For example, an inorganic whisker group such as a calcium carbonate, a magnesium carbonate, a potassium titanate whisker and an aluminum borate whisker, or an inorganic fiber group such as a glass fiber and a metal fiber and a structure made by knitting in a woven manner, and an organic chemical compound such as a carbon black, a graphite powder, a carbon fiber, an alamide fiber and a polyester fiber can be added.

Still further, in order to prevent the polyolefin resin from deteriorating due to heat, and age resistor such as an N,N'-diphenyl-P-phenyldiamine, 2,2'-methylene(4-ethyl-6-t-butyl phenol) can be added, and in order to prevent from deteriorating due to light, an ultraviolet ray absorbent such as 2-hydroxy-4-n-octoxy benzophenone and a 2-(2'-hydroxy-3'-t-buthyl-5'-metylphenyl)-5-chlorobenzo triazole can be added.

Preferably, all the additive agents (other than the polyolefin resin and the lubricant) make up 20 weight % or less of the total amount.

Since the polymer member is in a solid state which is different from the grease and the lubricating oil, no water and no dust enter thereinto. Accordingly, when the polymer containing the lubricant is filled in the space between the ball nut end and the screw shaft, in addition to the seal member or in place of the seal member, the water and the dust effecting the life reduction of the ball screw can be substantially prevented from passing.

The nature, utility and principle of the invention will be more clearly understood from the following detailed description and the appended claims when read in conjunction with the accompanying drawings.

DETAILED DESCRIPTION OF THE PREFERRED EMBODIMENTS

Embodiments according to the present invention will be described below with reference to the drawings.

Figure 1:
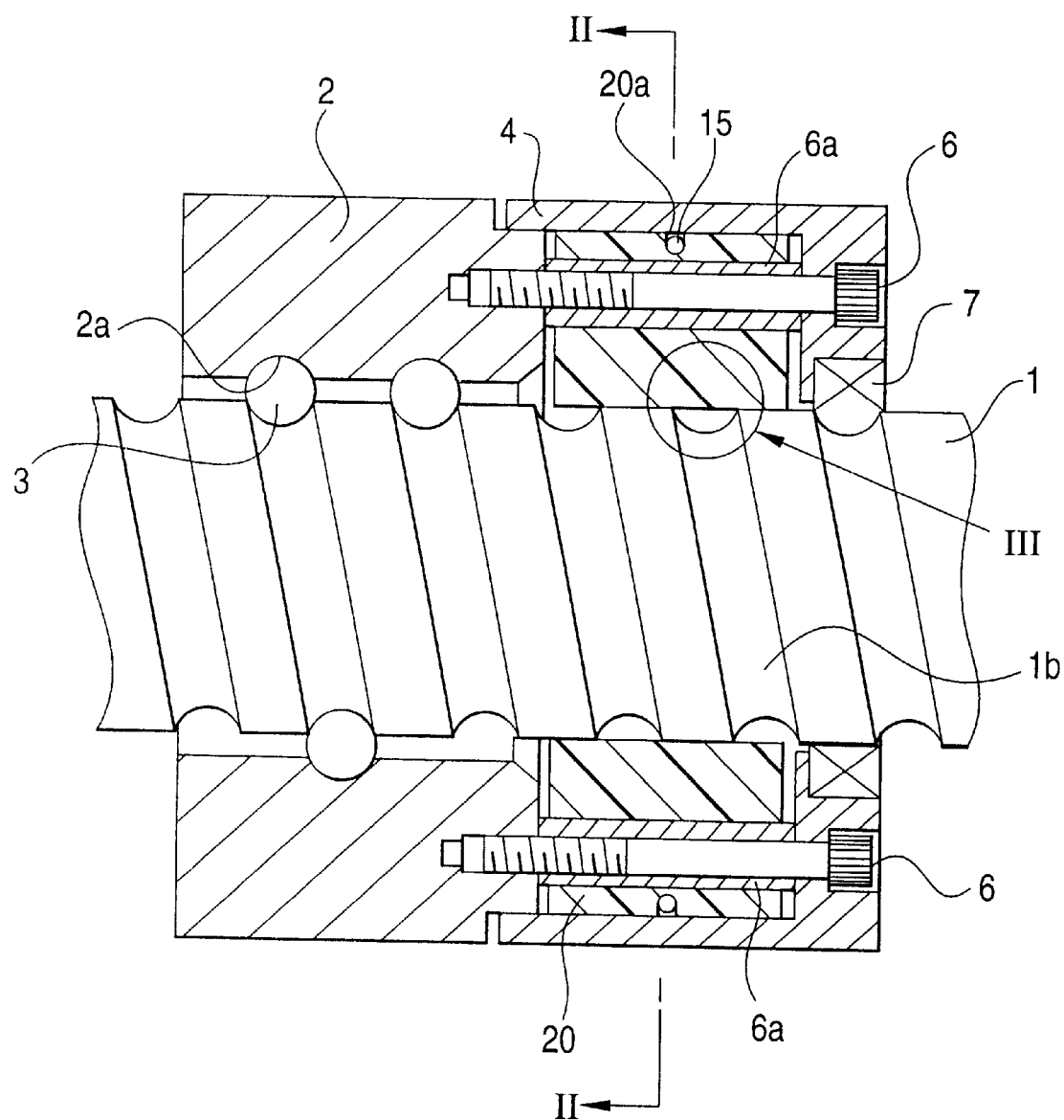
FIG. 1 is a cross sectional view which shows a lubricating apparatus for a ball screw in accordance with an embodiment of the invention in a state of being mounted to a ball nut.
Figure 2:
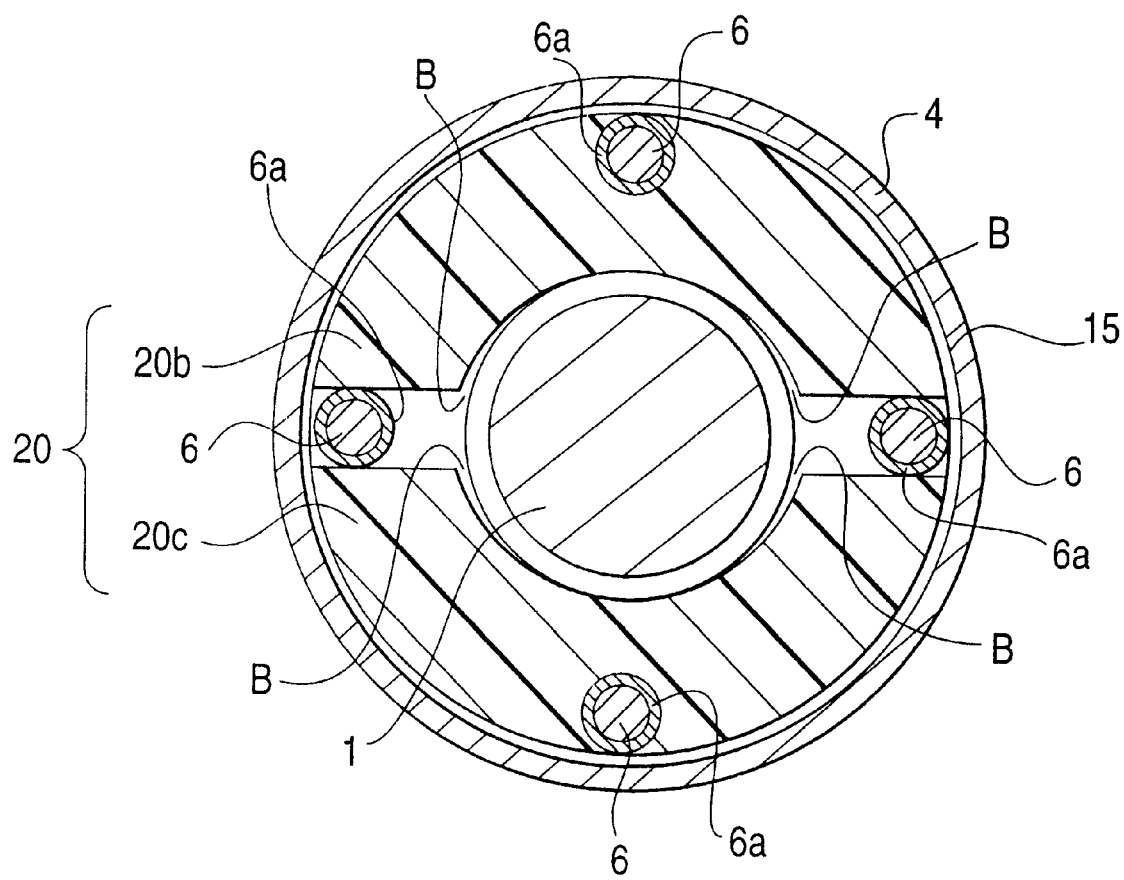
FIG. 2 is a cross sectional view of the lubricating apparatus of FIG. 1 taken along a line II—II.
Figure 3:
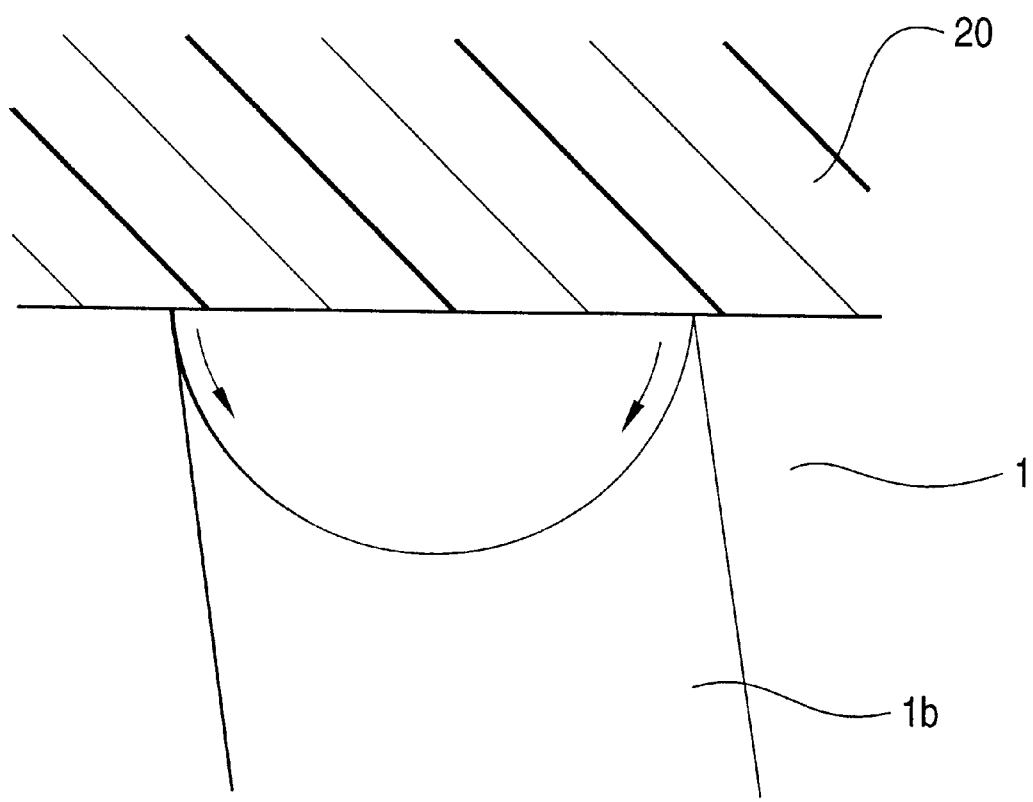
FIG. 3(a) is an enlarged cross sectional view of the lubricating apparatus of FIG. 1 labeled as III.
FIG. 3(b) is a cross sectional view in the same manner as that of FIG. 3(a), which shows a modified embodiment of the polymer member in accordance with the first embodiment.
Figure 3:
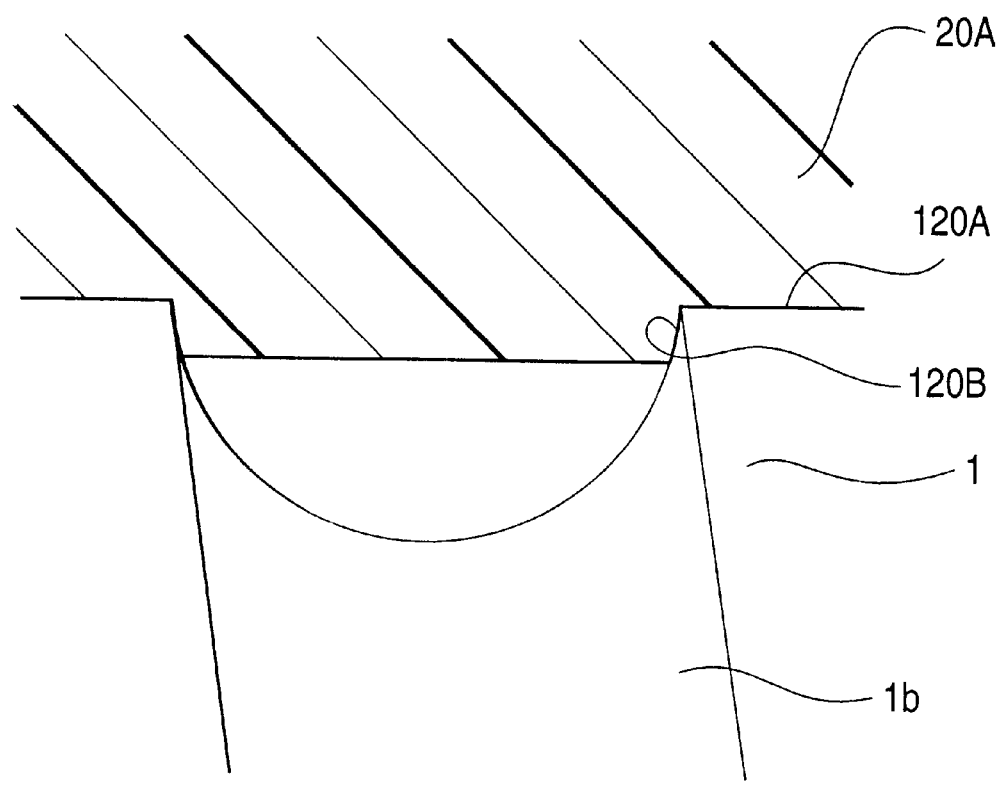

FIG. 1 is a cross sectional view which shows a lubricating apparatus for a ball screw in accordance with a first embodiment of the invention in a state of being mounted to a ball nut. FIG. 2 is a cross sectional view of FIG. 1 taken along a line II—II. FIG. 3(a) is an enlarged cross sectional view of a portion of the structure of FIG. 1 labeled as III.

Referring first to FIG. 1, a ball nut 2 is shown disposed on a screw shaft 1. A plurality of balls 3 are rotatably disposed between a thread groove 2a formed on an inner peripheral surface of the ball nut 2 and a thread groove 1b formed on an outer peripheral surface of the screw shaft 1 opposing the inner peripheral surface of the ball nut 2.

A cylindrical seal cap 4 is mounted to a rightward end of the ball nut 2 through a polymer member 20 containing a lubricant by means of four bolts 6. A sleeve 6a is disposed on an outer periphery of a shaft portion of each of the bolts 6. A labyrinth seal 7 is mounted to an end portion of the seal cap 4, and prevents a foreign material, such as dust, from entering the ball nut 2 between the screw shaft 1 and the seal cap 4.

The polymer member 20 has a narrow groove 20a formed on an outer periphery thereof. A garter spring 15 is disposed in the groove 20a to apply a predetermined force to move the polymer member 20 radially inward toward the outer periphery of the screw shaft 1 so that a suitable contact between the polymer member 20 and the screw shaft 1 is maintained even when an inner peripheral surface of the polymer member 20 is abraded over time, thereby assuring good lubrication.

As shown in FIG. 2, the polymer member 20 includes an upper half portion 20b and a lower half portion 20c, each formed in a substantially half cylindrical shape. For example, where the outer diameter of the screw shaft 1 is 40 mm, the inner diameter of the upper half portion 20b and the lower half portion 20c is 40.4 mm. Accordingly, as is exaggeratingly shown in FIG. 2, only the center of the upper half portion 20b and the lower half portion 20c is brought into contact with the outer peripheral surface of the screw shaft 1, while the ends form four gaps B with respect to the outer periphery of the screw shaft 1.

Because the inner diameter of the polymer member 20 is larger than the outer diameter of the screw shaft 1, and a rigidity thereof is relatively high after the garter spring 15 is mounted to the outer periphery of the polymer member 20 containing the lubricant, the gaps B are not lost. Further, the ends of the upper half portion 20b and the lower half portion 20c are maintained apart from each other. Further, as is apparent from FIG. 3(a), the inner periphery of the polymer member 20 is formed in a cylindrical shape, such that there is no projecting portion fitted into the thread groove 1b of the screw shaft 1.

Thus, in operation, when the screw shaft 1 is rotated with respect to the ball nut 2, the screw shaft 1 slides relative to the polymer member 20. As shown in FIG. 2, since the gaps B are formed between ends of the upper half portion 20b and the lower half portion 20c of the polymer member 20 and the outer periphery of the screw shaft 1, the ends of the upper half portion 20b and the lower half portion 20c do not scrape off the lubricant attached to the outer periphery of the screw shaft 1 (that is, a scraper effect is not generated) even when the screw shaft 1 rotates in either direction, the lubricant instead entering into the gaps B. Accordingly, the lubricant attached to the screw shaft 1 is not lost, and the lubrication of the ball and the thread groove can be assured.

Further, since the polymer member 20 does not have a projecting portion fitted into the thread groove 1b of the screw shaft 1, the lubricant attached to the thread groove 1b is not scraped out. In fact, the lubricant entering into the gap B (FIG. 2) in accordance with a rotation of the screw shaft 1 and attached to the outer periphery of the screw shaft 1 is not lost when the upper half portion 20b and lower half portion 20c are respectively brought into contact with the outer periphery of the screw shaft 1 in the center portion, lubricant flowing into the thread groove 1b as shown in FIG. 3(a), thereby further increasing a lubricating effect.

FIG. 3(b) is a cross sectional view which shows a modified embodiment of the polymer member 20. A polymer member 20A has an inner peripheral surface 120A which contacts the outer peripheral surface of the screw shaft 1 and a trapezoidal projection 120B which contacts a radially outer portion of the thread groove 1b of the screw shaft 1.

Figure 4:
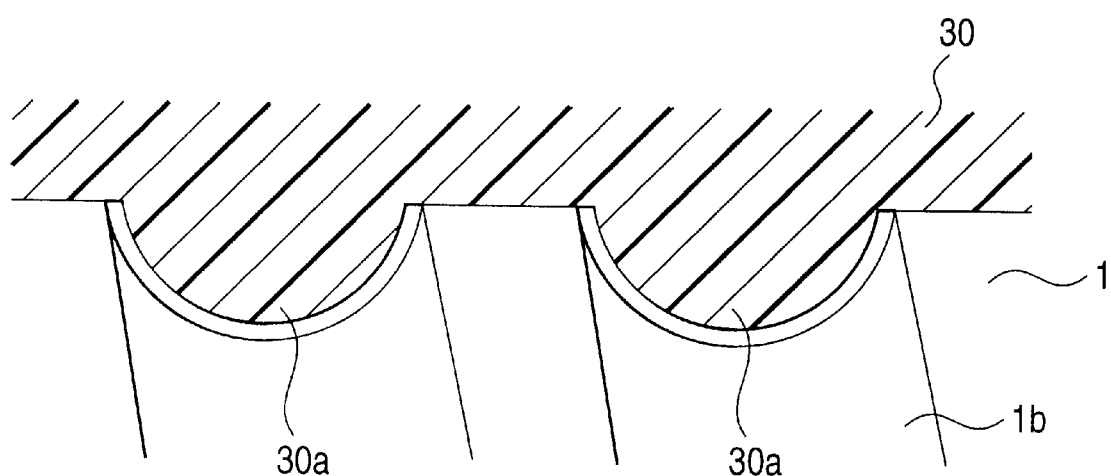
FIG. 4 is a cross sectional view in the same manner as that of FIG. 3, which shows another embodiment of the polymer member.

FIG. 4 is a cross sectional view which shows a another embodiment of a polymer member. In accordance with this embodiment, a polymer member 30 has a convex portion 30a conforming to the thread groove 1b of the screw shaft 1, which is different from the embodiment mentioned above. The convex portion 30a is not in contact with the outer surface of the thread groove 1b, and is spaced therefrom.

The polymer member 30 does not scrape out the lubricant attached to the thread groove 1b to the outer portion. In fact, because of the projecting portion 30a provided in this embodiment, a labyrinth space is formed between the thread groove 2b and the projecting portion 30a, whereby the foreign material, such as dust, is prevented from attaching to the thread groove 1b and from entering into the ball nut 2.

Figure 5:
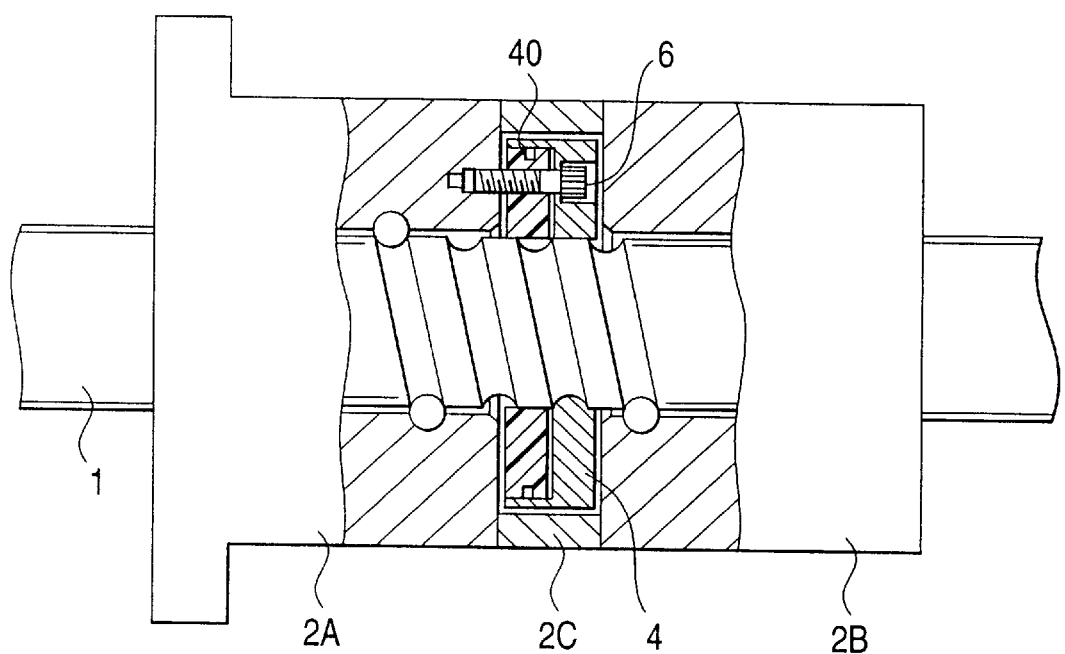
FIG. 5 is a cross sectional view which shows a lubricating apparatus for a ball screw in accordance with a further embodiment of the invention in a state of being mounted to a ball nut.

FIG. 5 is a cross sectional view which shows a lubricating apparatus for a ball screw in accordance with another embodiment of the invention mounted to a ball nut. In the structure shown in FIG. 5, further shortened the length of the nut, the polymer member 40 is disposed within a pre-load interposed seat space formed by a pre-load interposed seat 2C disposed between a first nut 2A and a second nut 2B. Because the structure, operation and effect of this embodiment are the same as those of the earlier embodiments except that the axial length of the nut is shortened, further explanation thereof will be omitted here. Alternatively, the cap 4 may be omitted, such that the bolt 6 is brought into direct contact with the member 40.

Figure 6:
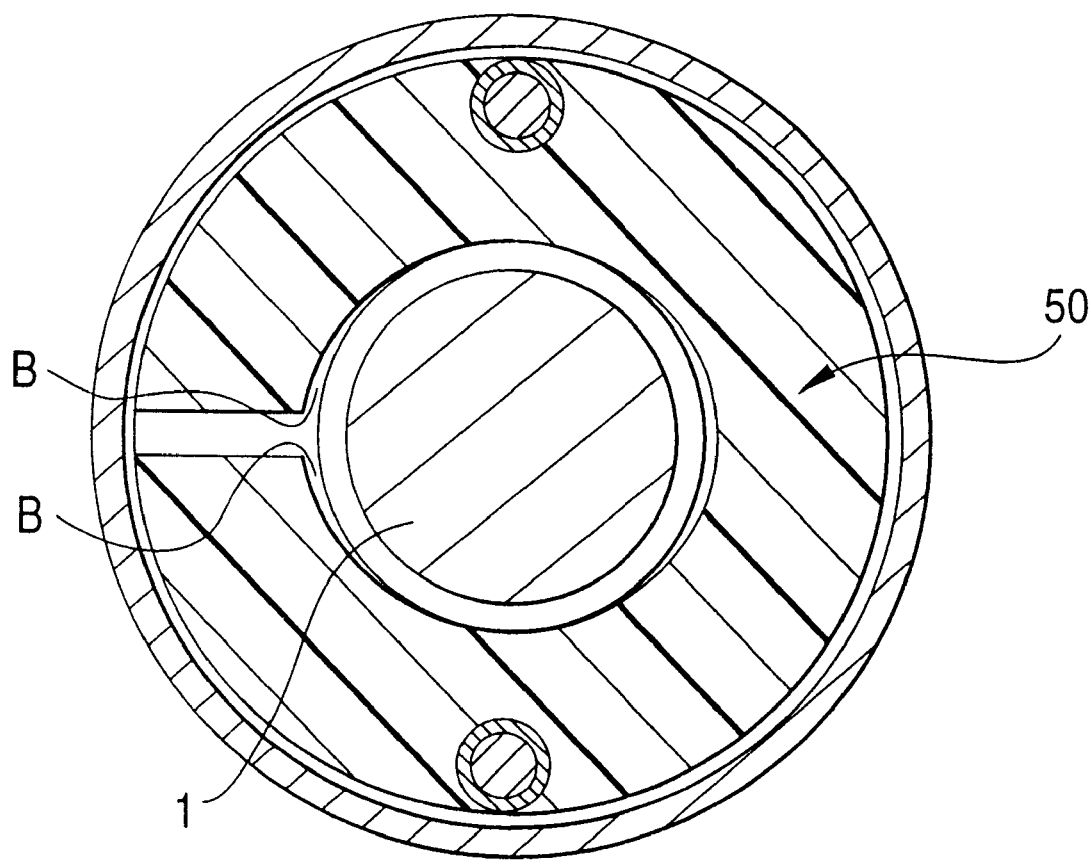
FIG. 6 is a cross sectional view which shows a polymer member containing a lubricant in accordance with yet another embodiment of the invention.

FIG. 6 is a cross sectional view of a polymer member in accordance with a further embodiment of the invention. Because of the similarities, an explanation will be given mainly with respect to the difference between this embodiment and that shown in FIG. 2.

In this embodiment, a polymer member 50 is not separated into two portions, but has an integral body having a C-shaped cross section. However, both ends thereof are spaced from the outer periphery of the screw shaft 1 to form the gaps B, the lubricant attached to the outer periphery of the screw shaft 1 is not scraped off in the same manner as that of the embodiment shown in FIG. 2.

Figure 7:
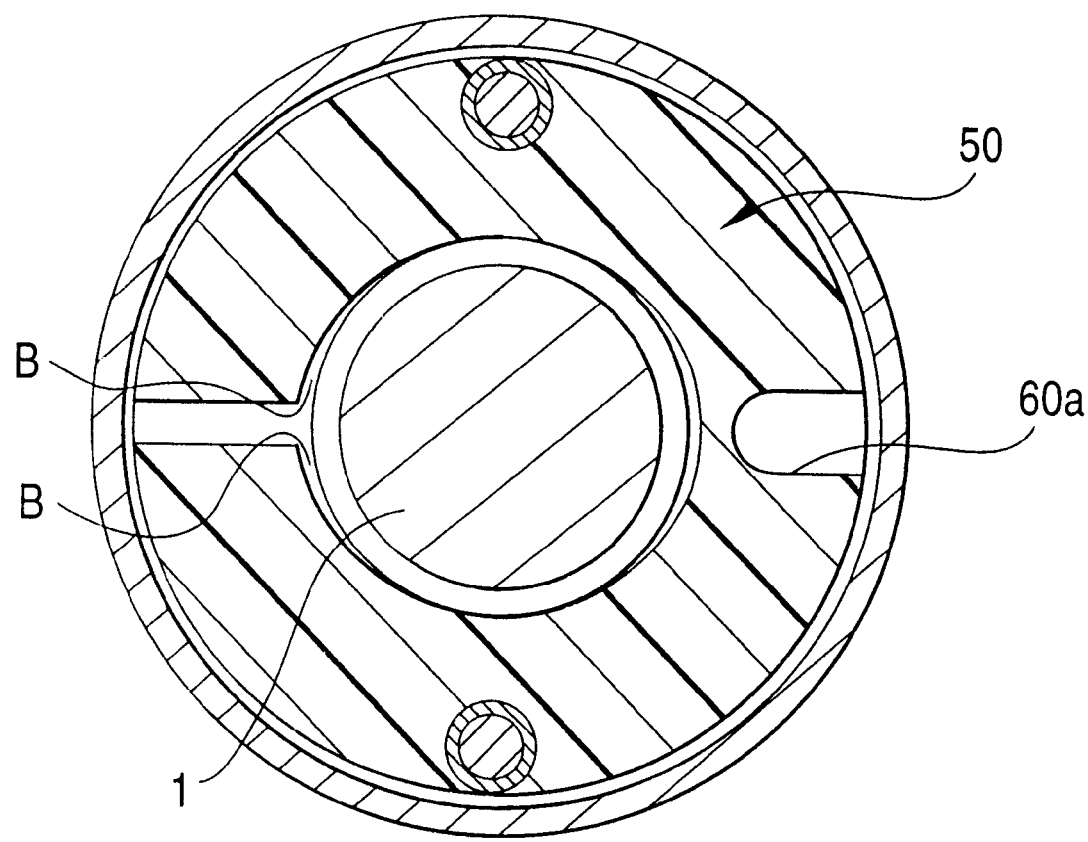
FIG. 7 is a cross sectional view which shows a polymer member containing a lubricant in accordance with a still further embodiment of the invention.

FIG. 7 is a cross sectional view of a polymer member with a yet another embodiment of the invention. Because of the similarities, an explanation will be given mainly with respect to the differences between this embodiment and that shown in FIG. 2.

In this embodiment, a polymer member 60 is not separated into two portions, but has an integral body having a C-shaped cross section with a U-shaped notch 60a formed in a part of the outer peripheral surface thereof. Accordingly, in comparison with the polymer member 50 shown in FIG. 6, the polymer member 60 is more easily bent. Where the polymer member is quite large or made of a material having a high rigidity, this embodiment is particularly effective.

Figure 8:
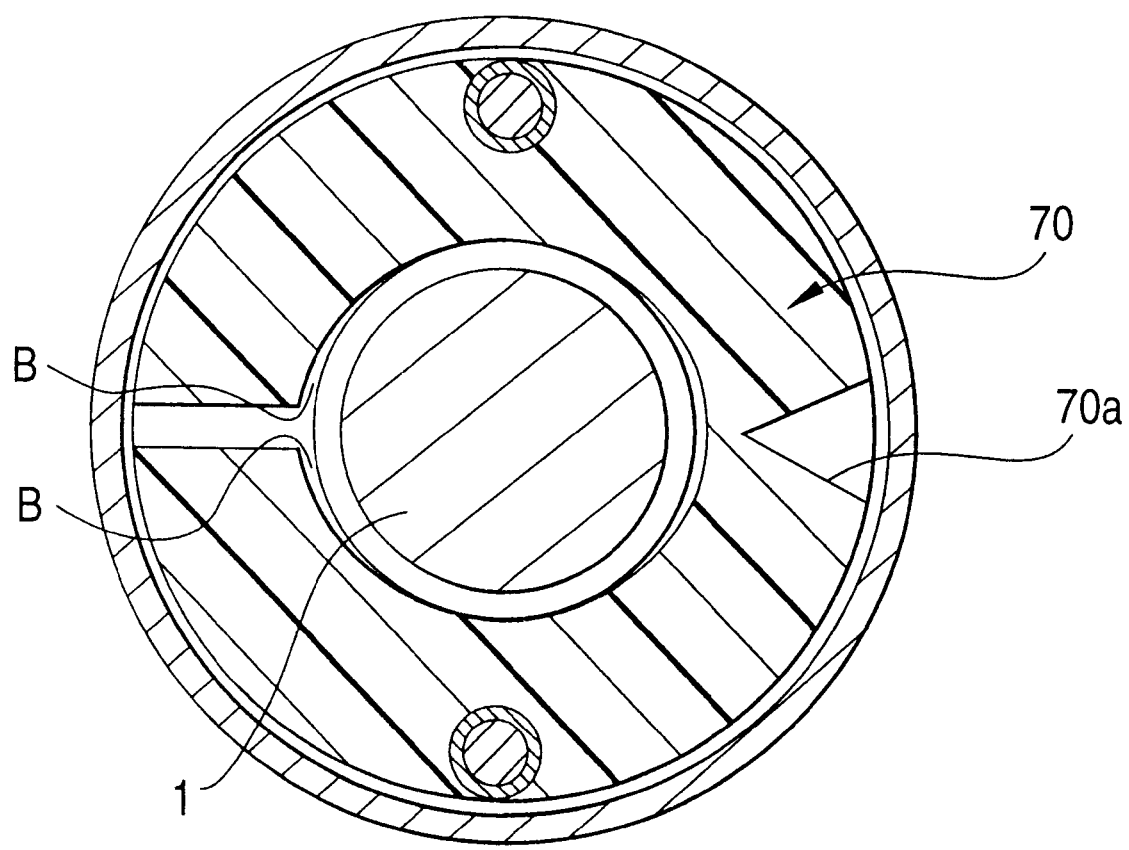
FIG. 8 is a cross sectional view which shows a polymer member containing a lubricant in accordance with another embodiment of the invention.

FIG. 8 is a cross sectional view of a polymer member in accordance with a still further embodiment of the invention. Because of the similarities, an explanation will be given mainly with respect to the difference between this embodiment and that shown in FIG. 2.

In this embodiment, a V-shaped notch 70a is formed in a part of an outer peripheral surface of a polymer member 70. Accordingly, in comparison with the embodiment mentioned above, in this embodiment, the polymer member 70 containing the lubricant is more easily bent.

Figure 9:
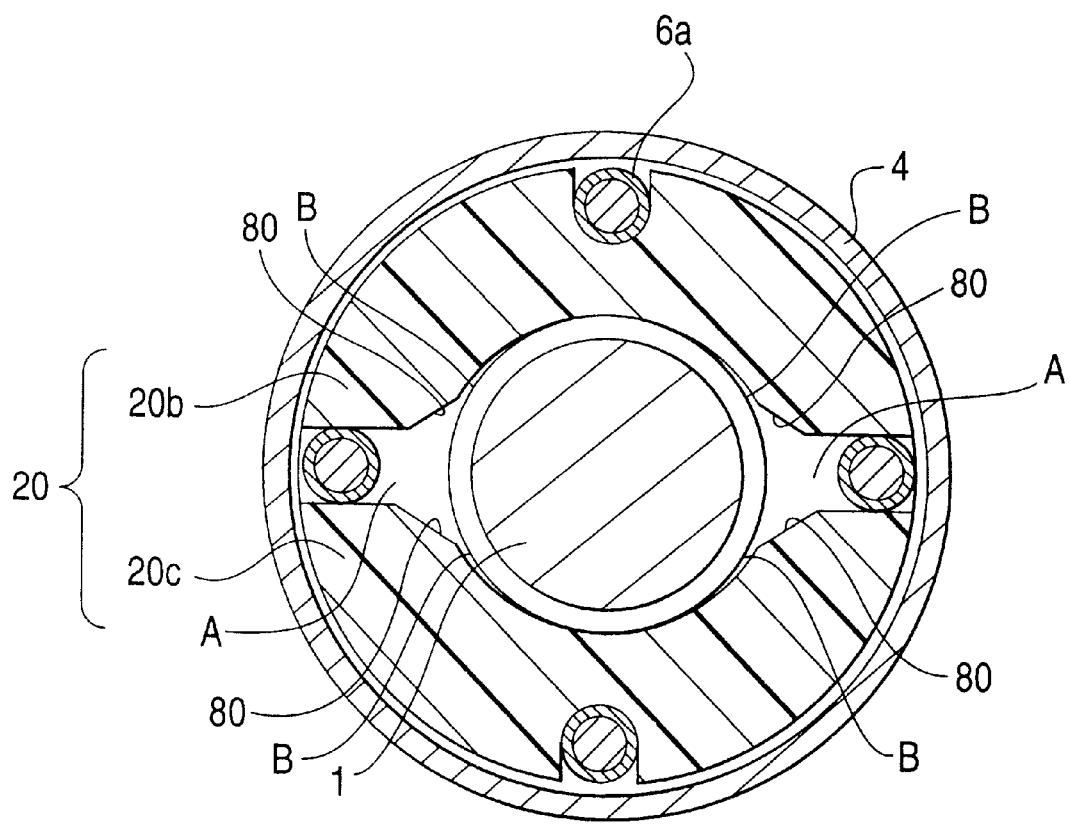
FIG. 9(a) is a cross sectional view which shows a polymer member containing a lubricant in accordance with a yet another embodiment of the invention.
FIG. 9(b) is a cross sectional view which shows a modified embodiment of the polymer member containing a lubricant in accordance with the embodiment of the invention shown in FIG. 9(a)
Figure 9:
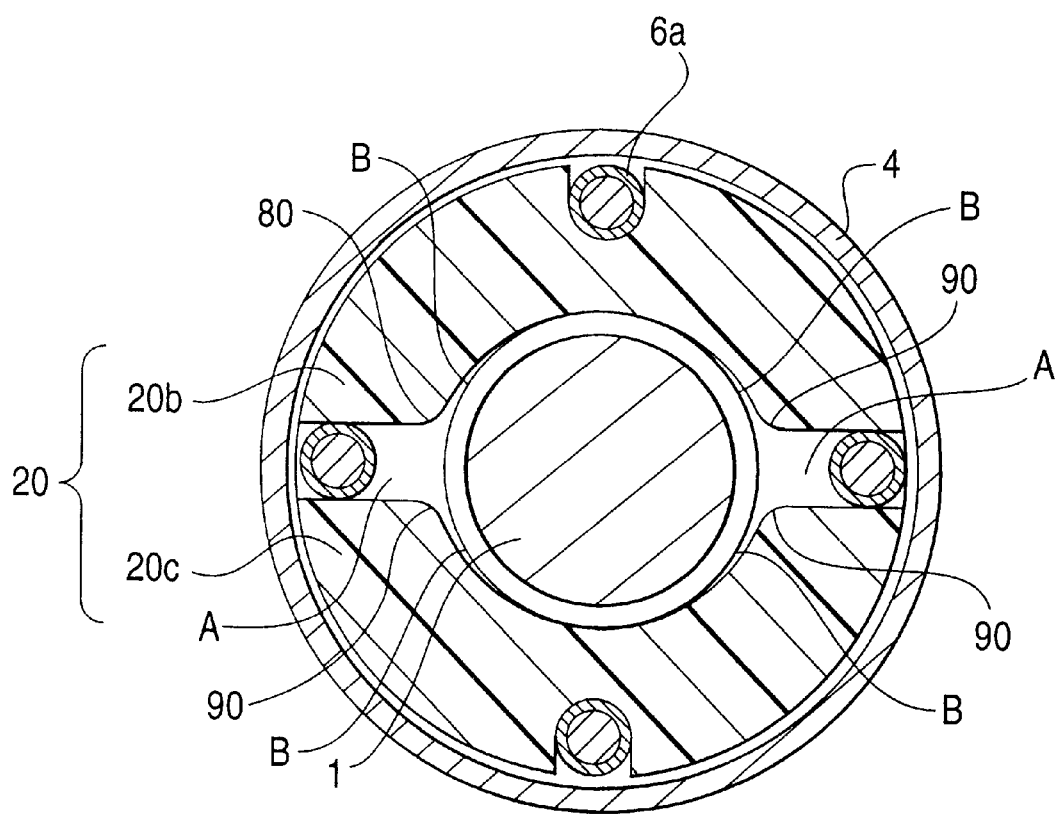
Figure 10:
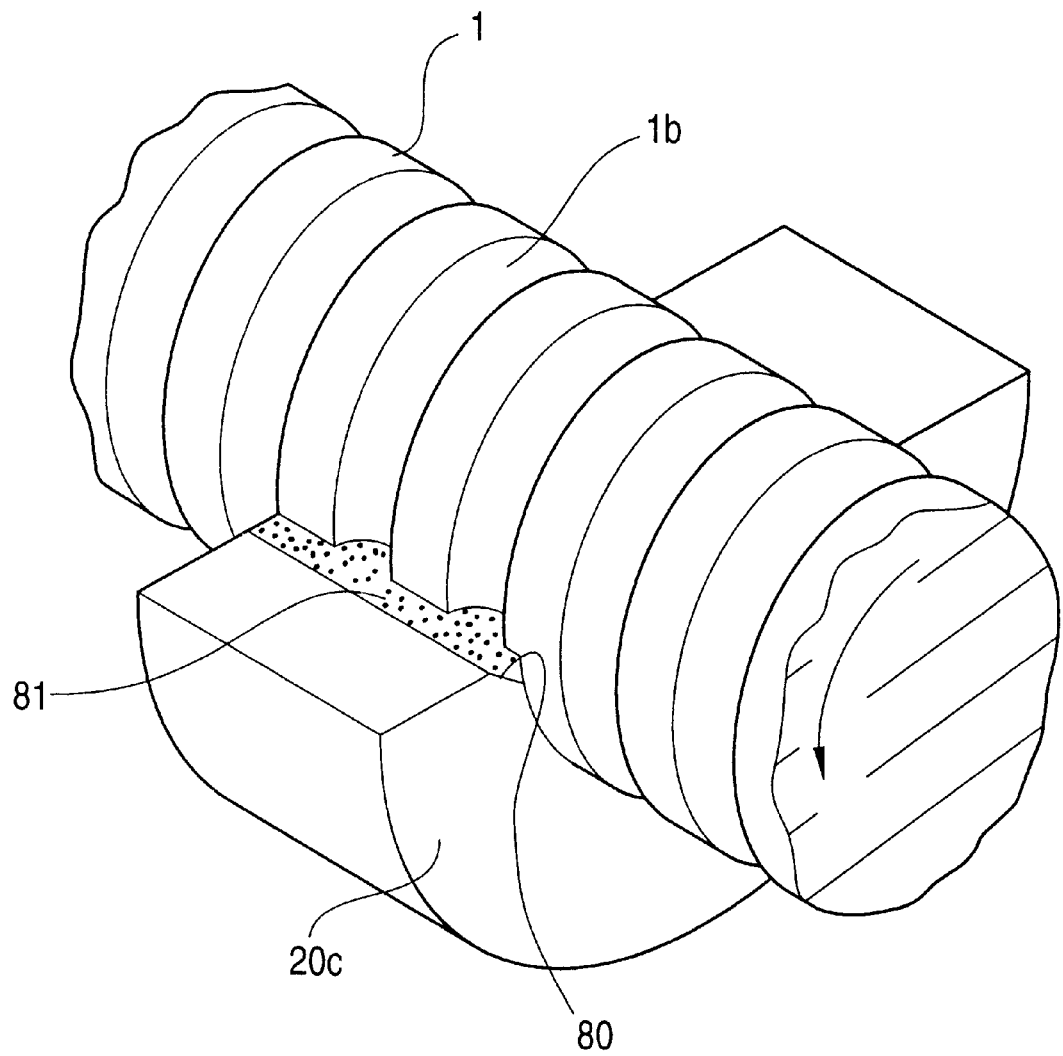
FIG. 10 is a perspective view which shows a main portion for explaining an operation of the embodiment shown in FIG. 9(a)

FIG. 9(a) is a cross sectional view of a polymer member in accordance with another embodiment of the invention. FIG. 10 is a perspective view which shows a lower half portion of the polymer member according to this embodiment. Because of the similarities, an explanation will be given mainly with respect to the difference between this embodiment and that shown in FIG. 2.

In this embodiment, in the same manner as the embodiment shown in FIG. 2, the polymer member 20 includes an upper half portion 20b and a lower half portion 20c respectively formed in a substantially half cylindrical shape. However, a beveling 80 for holding a lubricant is formed in an end portion close to an inner diameter of a separation surface in each of the upper half portions 20b and the lower half portion 20c. Further, because the polymer member 20 containing the lubricant is open to the outer diameter direction of the nut in the sleeve 6a, a radial pressing toward the outer periphery of the screw shaft 1 in the polymer member 20 containing the lubricant is more effectively performed than by the garter spring 15 shown in FIG. 1.

In accordance with this embodiment, the polymer member 20 containing the lubricant is swung or deformed in a bending manner at a time when the thread groove is rotated, so that the lubricant is prevented from flowing out to the gap A even when the scraper effect is generated due to the separation surface mentioned above. For example, even when the outer peripheral surface of the screw shaft 1 and the inner peripheral surface of the lower half portion 20c are in closely contact with each other as a result of an oscillation of the polymer member 20 thereby collapsing the gap B, as shown in FIG. 10, the lubricant scraped out by the lower half portion 20c is held within the beveling 80 as a lubricating oil reservoir 81 and does not easily flow into the gap A. Accordingly, because the lubricant does not flow easily into the gap A, the lubricating oil is instead gradually supplied to the thread groove 1b from the lubricating oil reservoir 81, and a good lubrication can be performed over a long period of time.

Further, FIG. 9(b) is a cross sectional view which shows a modified embodiment of the polymer member in accordance with the embodiment of the invention shown in FIG. 9(a), except that the beveling 90 for holding the lubricant has a rounded shape.

Figure 11:
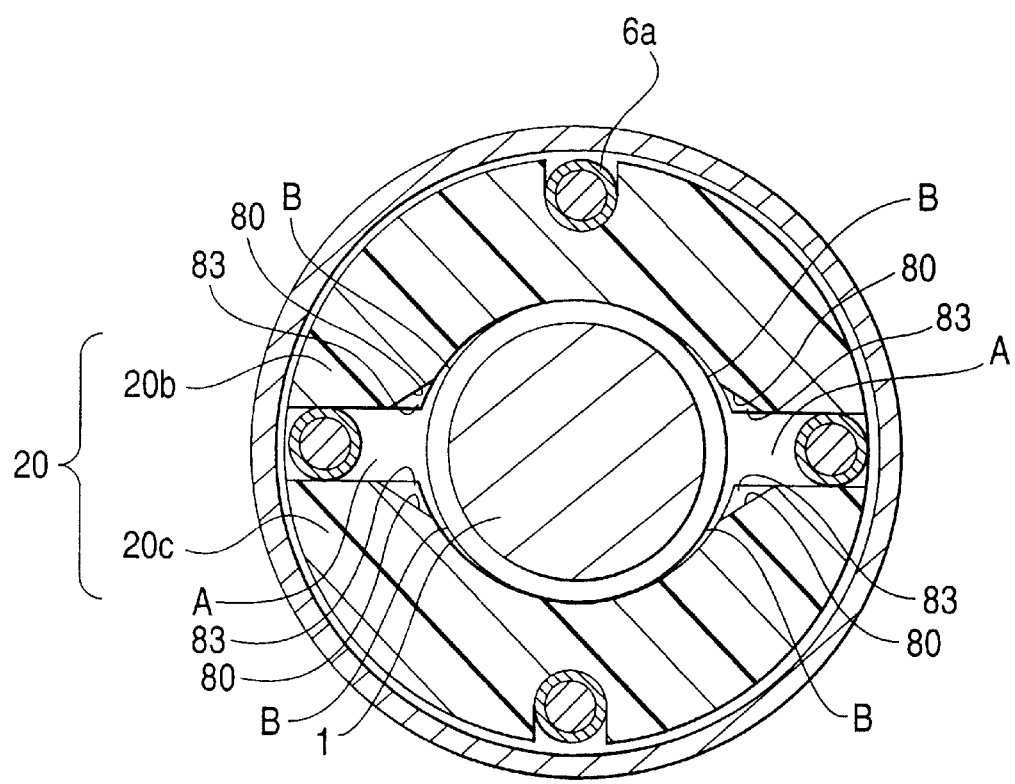
FIG. 11 is a cross sectional view which shows a polymer member containing a lubricant in accordance with an further embodiment of the invention.
Figure 12:
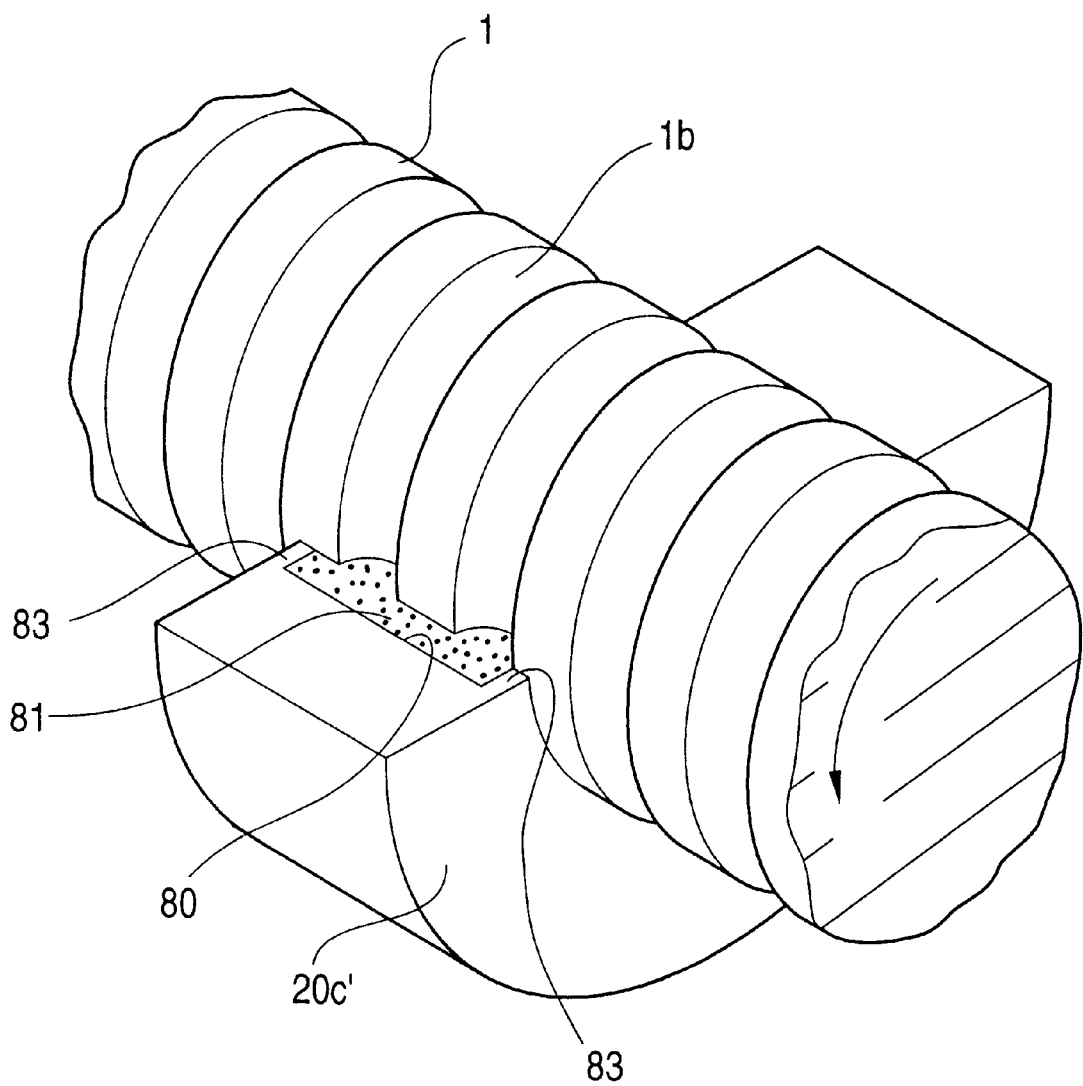
FIG. 12 is a perspective view which shows a main portion for explaining an operation of the embodiment of FIG. 11.

FIG. 11 is a cross sectional view of a polymer member in accordance with a yet another embodiment of the invention. Further, FIG. 12 is a perspective view which shows a main portion of the lower half portion in the polymer member of the this embodiment. Because of the similarities, an explanation will be given mainly with respect to the difference between this embodiment and that shown in FIG. 2.

In this embodiment, substantially the same structure as that of the embodiment shown in FIG. 9(a) is employed, the beveling 80 for the holding the lubricant being formed in such a manner as to leave the ends in the axial direction as partition walls 83 rather than forming the beveling 80 along the entire length of the end portion close to the inner diameter of the upper half portion 20b and the lower half portion 20c.

An operation of this embodiment is substantially the same as that of the embodiment shown in FIG. 9(a), and even when the scraper effect is generated by the separation surface, the lubricant is prevented from flowing out to the gap A. However, in addition, the lubricant is prevented from flowing out from the end surface in the axial direction. Accordingly, as shown in FIG. 12, the lubricant scraped out by the lower half portion 20c is held within the beveling 80 for holding the lubricant as lubricating oil reservoir 81, and further, does not easily flow out from the end surface in the axial direction of the lower half portion 20c as a consequence of the partition walls 83. Accordingly, the lubricant is securely held within the beveling 80, the lubricating oil being supplied gradually to the thread groove 1b from the lubricating oil reservoir 81, and a good lubrication being performed over a long period of time.

The polymer members 20, 20A, 30, 40, 50, 60, and 70 in accordance embodiments mentioned above may be assembled with the associated ball nut 2 in such a manner as to surround the screw shaft 1 therewithin as will be described below.

Figure 13:
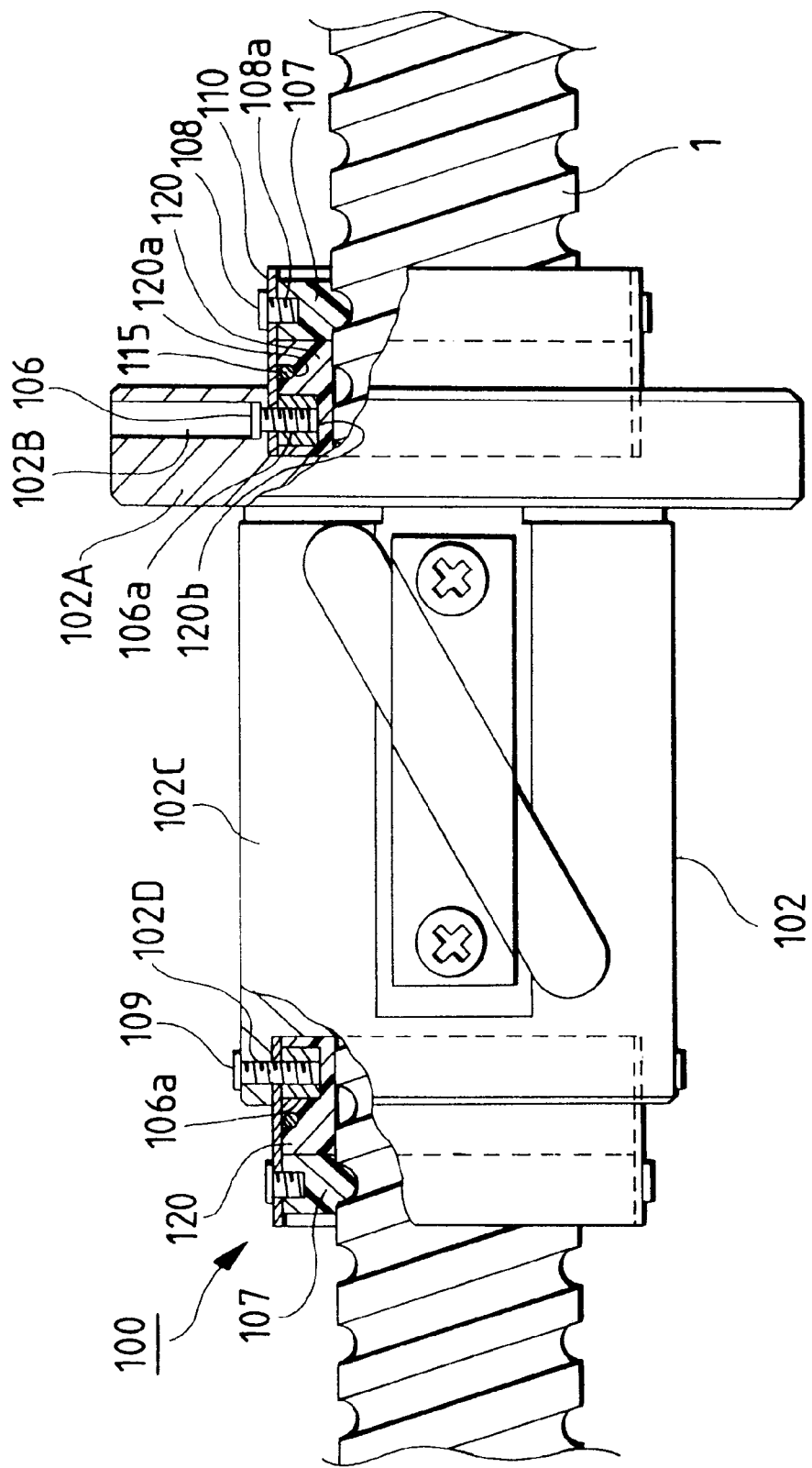
FIG. 13 is a cross sectional view which shows an assembling structure at a time of assembling the polymer member containing a lubricant in accordance with the embodiments mentioned above of the invention to the ball nut.

In one such assembly shown in FIG. 13, a ball nut 102 is disposed in such a manner as to surround the screw shaft 1 therewithin, and a plurality of balls are rotatably disposed between a thread groove formed on an inner periphery of the ball nut 102 and the thread groove formed on the outer periphery of the screw shaft 1 opposing thereto. A cylindrical seal assembly 100 for preventing dust from entering is mounted to both of right and left ends of the ball nut 102. The seal assembly 100 is provided with a polymer member 120 containing a lubricant, a labyrinth seal 107 facing to the polymer member 120 and a cylinder portion 110 surrounding the polymer member 120 containing the lubricant and the labyrinth seal 107 therewithin. The labyrinth seal 107 is fixed to the cylinder portion 110 by means of bolts 108 inserted into a plurality of bolt insertion holes 108a disposed at an equal interval to a peripheral direction on the outer peripheral surface of the cylinder portion 110. Note that a single bolt 108 and a single bolt insertion hole 108a may be used instead of the plurality of bolts 108 and the bolt insertion holes 108a shown.

The polymer member 120 has a narrow grove 120a on the outer periphery thereof, and the polymer member 120 containing the lubricant is radially pressed toward the outer periphery of the screw shaft 1 at a fixed pressure by means of the garter spring 115 disposed therein. As a consequence, a suitable contact between the polymer member 120 and the screw shaft 1 can be maintained and a good lubrication assured even when the inner peripheral surface of the polymer member 120 is abraded over time. Further, a plurality of recess portions 120b for housing a sleeve-like fixing ring 10a are provided at a equal interval to the peripheral direction in the outer peripheral portion of the polymer member 120 containing the lubricant. Note that a single recess portion 120b may be used instead of the plurality of recess portions 120b shown.

As shown in FIG. 13, the seal assembly 100 having the labyrinth seal 107 and the polymer member 120 therein is fixed to the ball nut 102 by means of a hole 102B provided in a flange portion 102A of the ball nut 102 and extending in a radial direction, a through hole 102D provided in the outer periphery of a ball nut body 102C and extending in a radial direction, and bolts 106 and 109 inserted into a through hole of a fixing ring 106a housed in the recess portion 102b. Note that the inner peripheral surfaces of the through hole 102B and the through hole 102D are respectively provided with threaded portions threadedly engageable with the bolts 106 and 109.

While bolts have been shown for attaching the labyrinth seal 107 and the polymer member 120 to the ball nut 102, it will be recognized that a pin or a screw can be used in place of the bolt.

Figure 14:
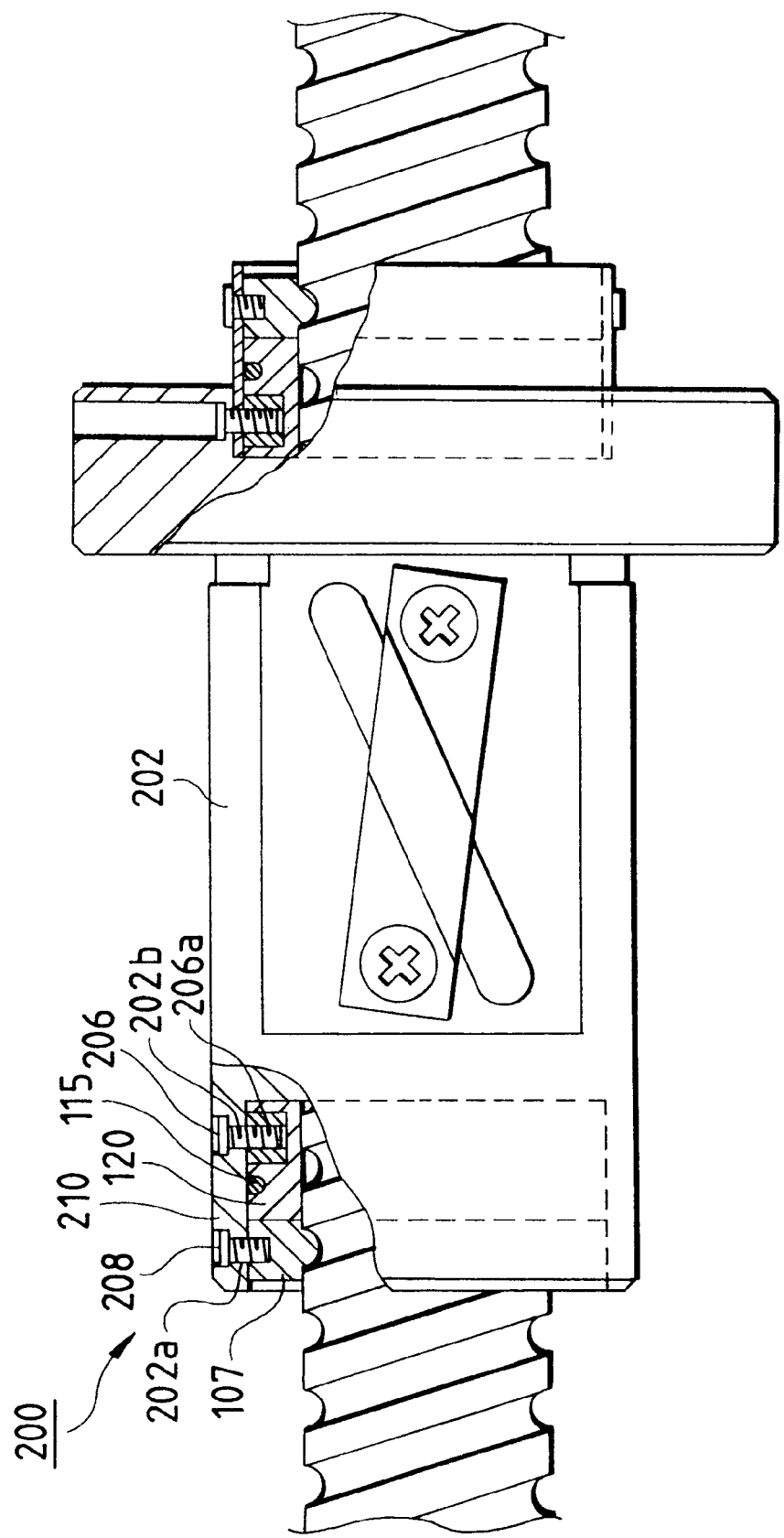
FIG. 14 is a cross sectional view which shows a modified embodiment of the assembling structure shown in FIG. 13.
Figure 15:
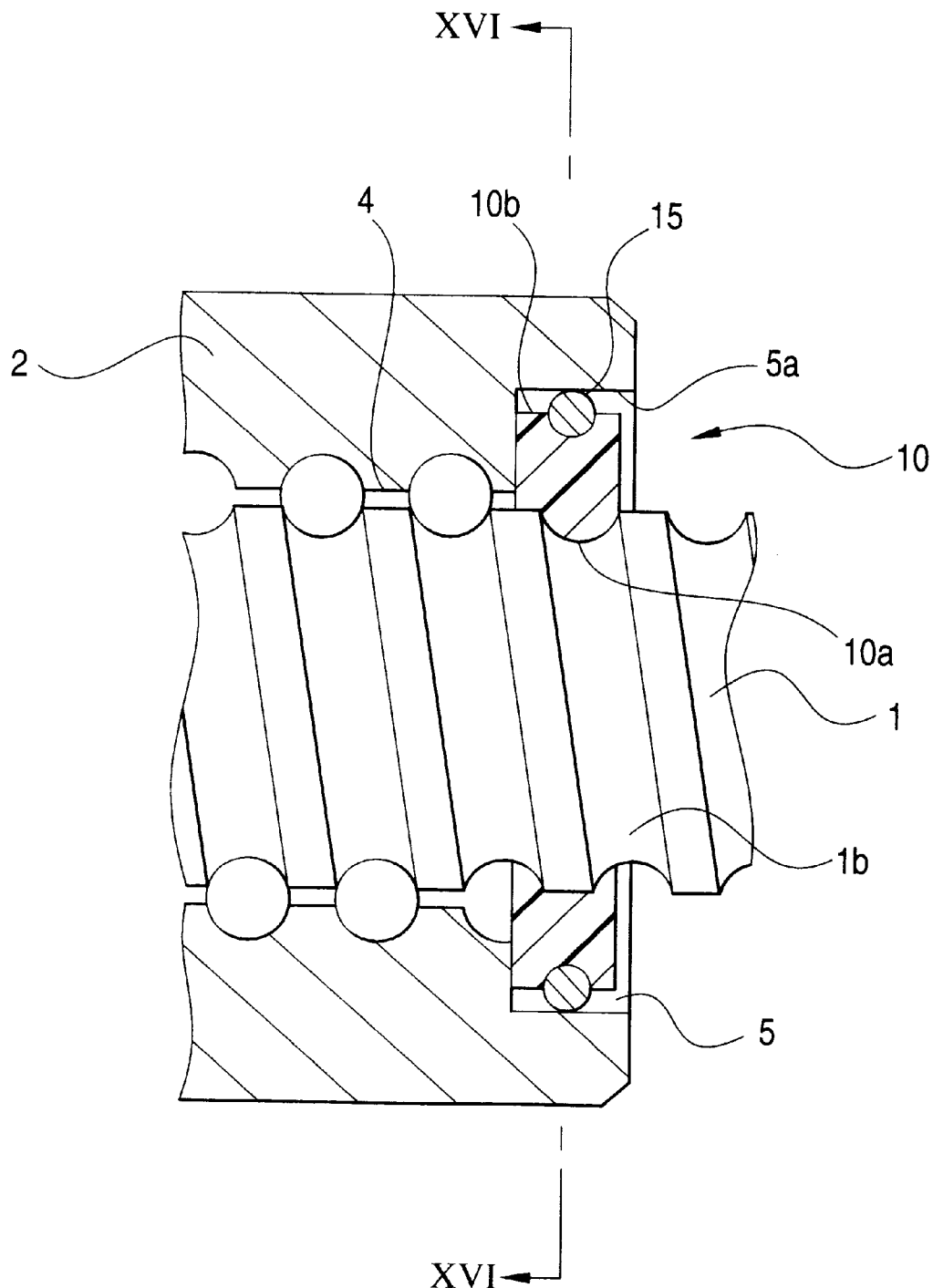
FIG. 15 is a cross sectional view which shows a conventional ball screw using a polymer member containing a lubricant.
Figure 16:
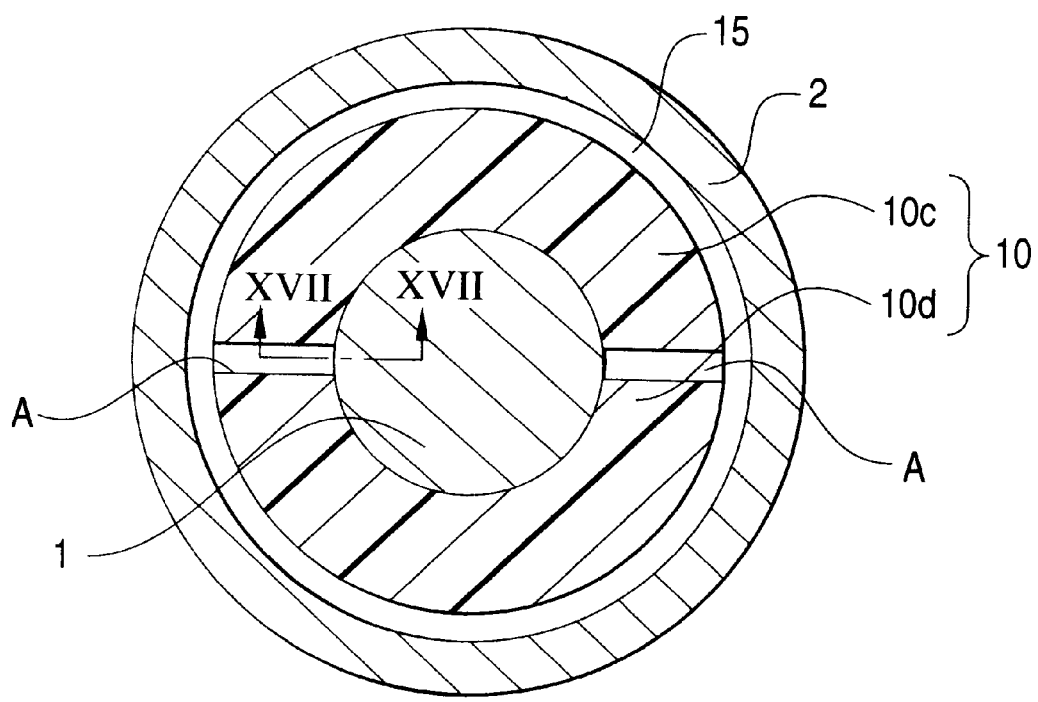
FIG. 16 is a cross sectional view of the conventional ball screw of FIG. 15 taken along a line XVI—XVI.

FIG. 14 shows a modified embodiment of the assembly shown in FIG. 13. Since the right half of FIG. 14 is the same as the right half of FIG. 13, the explanation thereof will be omitted.

As shown in the left half of FIG. 14, an assembly 200 includes a cylindrical portion 210 corresponding to the cylindrical portion 110 of the first assembling structure is integrally formed in the left end portion of the ball nut 202, and that the labyrinth seal 107 and the polymer member 120 containing the lubricant are housed within the cylinder portion 210. The labyrinth seal 107 is attached to the cylinder portion 210 by the bolt 208 inserted into the through hole 202a provided on the outer periphery of the cylinder portion 210 in the ball nut 202. Further, the polymer member 120 is structured such as to be attached to the cylinder portion 210 by the through hole 202b provided on the outer periphery of the cylinder portion 210 in the ball nut 202 and the bolt 206 inserted into the through hole of the fixing ring 206a. Note that the inner peripheral surfaces of the through hole 202a and the through hole 202b are respectively provided with threaded portions threadedly engageable with the bolts 206 and 208.

(Comparative Test)

Next, a comparative test between the lubricating apparatus for the ball screw in accordance with the conventional art and the lubricating apparatus for the ball screw in accordance with the invention will be described below.

Figure 17:
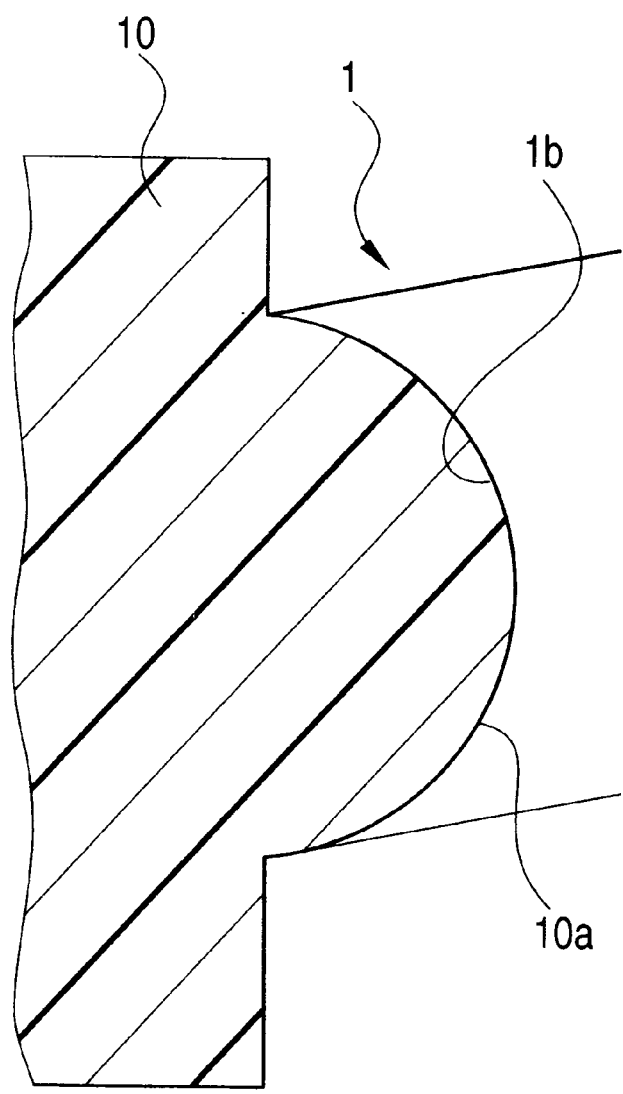
FIG. 17 is a cross sectional view of the conventional ball screw of FIG. 15 taken along a line XVII—XVII.

Under a high load condition corresponding to the case of employing the lubricating apparatus for the ball screw to a machine tool, and assuming a worst case condition such as grease deterioration within the ball nut, a comparative test with reference to a durability is performed between a lubricating apparatus for a ball screw using a polymer member containing a lubricant in slidable contact with the bottom portion of the thread groove in the ball screw shown in FIG. 17 and another lubricating apparatus for a ball screw in accordance with the invention using the polymer member containing a lubricant in slidable contact with only the outer peripheral surface of the ball screw as shown in FIG. 3(a).

In the comparative test, a load of 480 kg is applied in an axial direction to the nut of a ball screw BS4020 (having a ball circulation specification of 2.5 winds and 1 row type) presently on the market rotating at a speed of 2000 rpm, and an endurance running distance is measured under a severe lubricating condition. Under such conditions, a target endurance running distance 3000 km is desirable.

Using the conventional lubricating apparatus for the ball screw, an endurance running distance of 1432 km is measured. On the other hand, ball screw including a lubricating apparatus in accordance with the present invention was measured to have an endurance running distance of 4221 km. Accordingly, the inventive lubricating apparatus for the ball screw has three times the running distance, that is the durability, of that of the conventional art. Therefore, it has been ascertained that the inventive lubricating apparatus for the ball screw provides excellent lubricating performance.

In accordance with the lubricating apparatus for the ball screw of the invention, since the polymer member containing a lubricant mainly in slidable contact with an outer diameter portion of the screw shaft is mounted to at least any one of both ends of the ball nut and a space including a ball not-passing space in an inner portion of the ball nut, the polymer member prevents the lubricant attached to the thread groove from being scraped off during oscillations of the screw shaft, the lubricant attached to the thread groove can be effectively maintained. Further, in the structure made such that the polymer member in slidable contact with the outer diameter portions of the screw shaft is separated in a circumferential direction, so that the inner diameter size thereof is made larger than the outer diameter of the screw shaft, the effect of holding the lubricant can be further increased. Still further, through the use of beveling formed in the ends close to the inner diameter of the separation surface in the polymer member containing the lubricant, even when the lubricant attached to the outer periphery of the screw shaft is scraped off by the rotation of the polymer member containing the lubricant, the lubricant is held in the beveling for holding the lubricant so as to be supplied for lubricating.

While several different embodiments of the invention have been described above, it will be obvious to those skilled in the art that various changes and modifications may be made thereto without departing from the invention, and, therefore, the appended claims are meant to cover all such changes and modifications as fall within the true spirit and scope of the invention.

What is claimed is:

1. A lubricating apparatus for a ball screw, disposed between a ball nut and a screw shaft of the ball screw, comprising:

a polymer member containing a lubricant, the polymer member being mounted to at least any one of both ends of said ball nut and a space including a ball not-passing space in an inner portion of said ball nut, and having a surface which is slidably contactable with an outer diameter portion of said screw shaft and spaced from a surface of a thread groove formed on said screw shaft.

2. The lubricating apparatus for a ball screw as recited in claim 1, wherein said polymer member is separated into a plurality of portions in a circumferential direction, the inner diameter size defined by said portions is made larger than an outer diameter of the screw shaft.

3. The lubricating apparatus for a ball screw as recited in claim 2, wherein a beveling for holding a lubricant is formed at least one of both end portions of each separated portions in a circumferential direction.

4. The lubricating apparatus for a ball screw according to claim 1, wherein said outer diameter portion of said screw shaft is an outer peripheral surface where said thread groove is not provided.

5. The lubricating apparatus for a ball screw as recited in claim 1, wherein said polymer member has a slit which is provided in a portion of the circumferential direction, so that an inner diameter size defined by said polymer member is made larger than an outer diameter of the ball screw.

6. The lubricating apparatus for a ball screw as recited in claim 5, wherein a beveling for holding a lubricant is formed in said portion of said polymer member.

7. A lubricating apparatus for a ball screw, disposed between a ball nut and a screw shaft of the ball screw, comprising:

a polymer member containing a lubricant which is slidably contactable with only an outer diameter portion of said screw shaft and is mounted to at least any one of both ends of said ball nut and a space including a ball not-passing space in an inner portion of said ball nut.

8. The lubricating apparatus for a ball screw as recited in claim 7, wherein said polymer member is separated into a plurality of portions in a circumferential direction, the inner diameter size defined by said portions is made larger than an outer diameter of the ball screw.

9. The lubricating apparatus for a ball screw as recited in claim 8, wherein a beveling for holding a lubricant is formed at least one of both end portions of each separated portions in a circumferential direction.

10. The lubricating apparatus for a ball screw according to claim 7, wherein said outer diameter portion of said screw shaft is an outer peripheral surface where said thread groove is not provided.

11. The Lubricating apparatus for a ball screw as recited in claim 7, wherein said polymer member has a slit which is provided in a portion of the circumferential direction, so that an inner diameter size defined by said polymer member is made larger than an outer diameter of the ball screw.

12. The lubricating apparatus for a ball screw as recited in claim 11, wherein a beveling for holding a lubricant is formed in said portion of said polymer member.

13. A lubricating apparatus for a ball screw, disposed between a ball nut and a screw shaft of the ball screw, comprising:

a polymer member containing a lubricant which is slidably contactable with an outer diameter portion of said screw shaft and is mounted to at least any one of both ends of said ball nut and a space including a ball not-passing space in an inner portion of said ball nut, wherein said polymer member is partially engaged with a portion of the surface of thread groove formed on said screw shaft but disengaged from the bottom surface of said thread groove, in which said portion is adjacent of the outer diameter portion of said screw shaft.

14. The lubricating apparatus for a ball screw as recited in claim 13, wherein said polymer is separated into a plurality of portions in a circumferential direction, the inner diameter size defined by said portions is made larger than an outer diameter of the screw shaft.

15. The lubricating apparatus for a ball screw as recited in claim 14, wherein a beveling for holding a lubricant is formed at at least one of both end portions of each separated portions in a circumferential direction.

16. The lubricating apparatus for a ball screw as recited in claim 13, wherein said polymer member has a slit which is provided in a portion of the circumferential direction, so that an inner diameter size defined by said polymer member is made larger than an outer diameter of the ball screw.

17. The lubricating apparatus for a ball screw as recited in claim 16, wherein a beveling for holding a lubricant is formed in said portion of said polymer member.

* * * * *